(12) United States Patent
Watanabe et al.

(10) Patent No.: US 9,783,156 B2
(45) Date of Patent: Oct. 10, 2017

(54) WEBBING GUIDE

(71) Applicant: KABUSHIKI KAISHA TOKAI-RIKA-DENKI-SEISAKUSHO, Aichi-ken (JP)

(72) Inventors: Mikio Watanabe, Aichi-ken (JP); Ryuji Yamaguchi, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/156,931

(22) Filed: May 17, 2016

(65) Prior Publication Data

US 2016/0347273 A1 Dec. 1, 2016

(30) Foreign Application Priority Data

May 28, 2015 (JP) .................................. 2015-108888

(51) Int. Cl.
*B60R 22/18* (2006.01)
*B60R 22/24* (2006.01)

(52) U.S. Cl.
CPC .............. *B60R 22/18* (2013.01); *B60R 22/24* (2013.01); *B60R 2022/1831* (2013.01)

(58) Field of Classification Search
CPC . B60R 22/18; B60R 22/24; B60R 2022/1831; B60R 13/02
See application file for complete search history.

(56) References Cited

U.S. PATENT DOCUMENTS

| 2003/0234530 | A1* | 12/2003 | Moskalik | ................ B60R 22/18 280/801.1 |
| 2016/0257282 | A1* | 9/2016 | Ito | ........................... B60R 22/24 |
| 2016/0272148 | A1* | 9/2016 | Ito | ........................... B60R 22/18 |

FOREIGN PATENT DOCUMENTS

| JP | H0274258 U | 6/1990 |
| JP | 2011-195064 A | 10/2011 |

OTHER PUBLICATIONS

Japanese Office Action for corresponding Japanese Patent Application No. 2015-108888 dated Jun. 7, 2016 and English translation thereof.

* cited by examiner

*Primary Examiner* — Faye M Fleming
(74) *Attorney, Agent, or Firm* — Roberts Mlotkowski Safran Cole & Calderon PC

(57) ABSTRACT

Webbing guide includes: guide body through which webbing is inserted; front wall that contacts one side face of first opening edge part and second opening edge part; rear wall that contacts another side face of first opening edge part; and claw that contacts another side face of second opening edge part. Connection part connects guide body and rear wall and includes concave part, and leading end of first opening edge part enters into concave part when webbing guide is assembled with member for assembly.

6 Claims, 9 Drawing Sheets

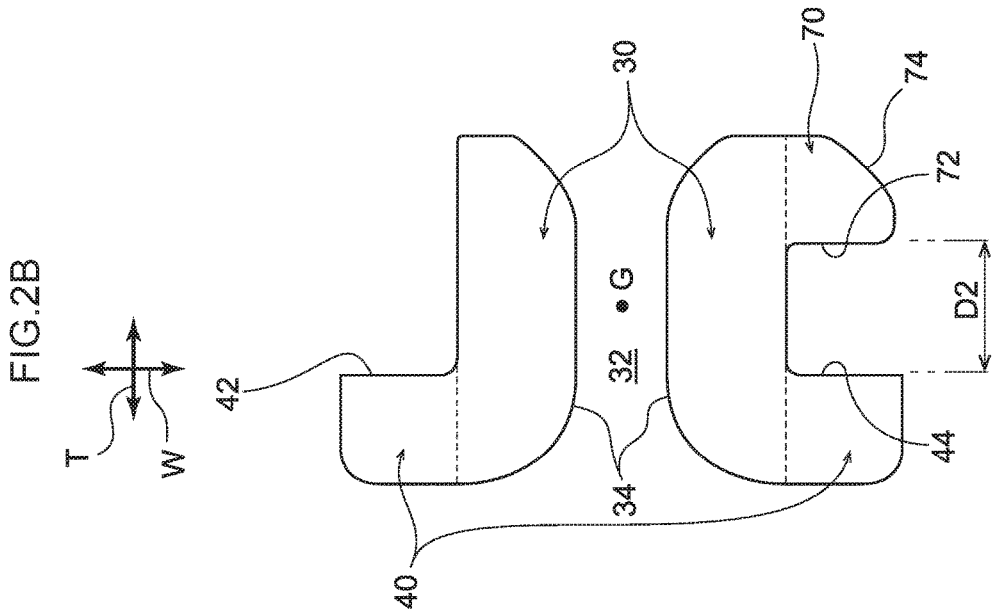
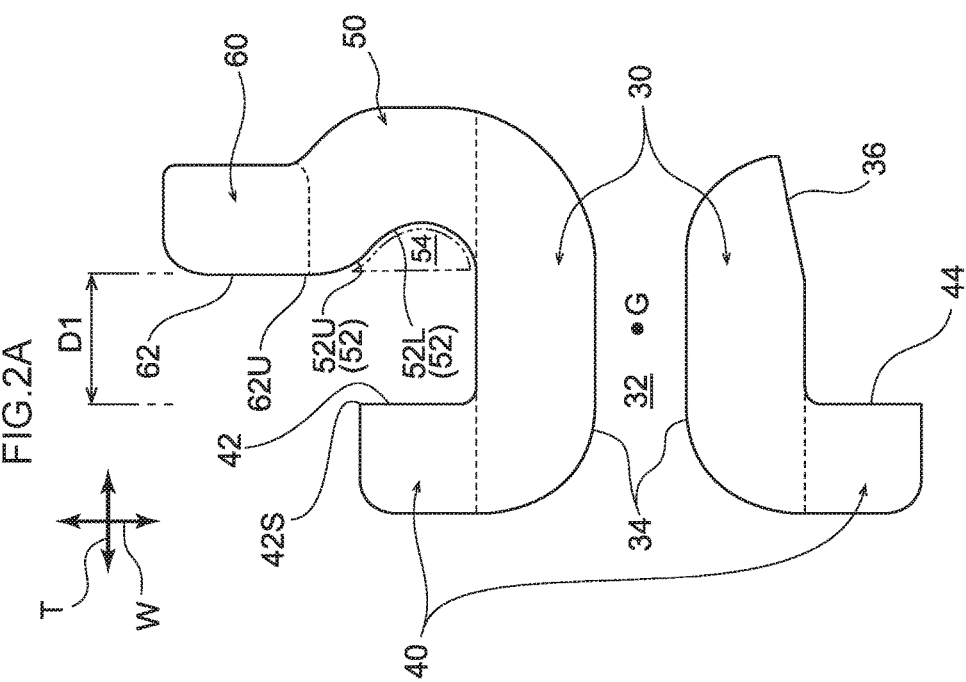

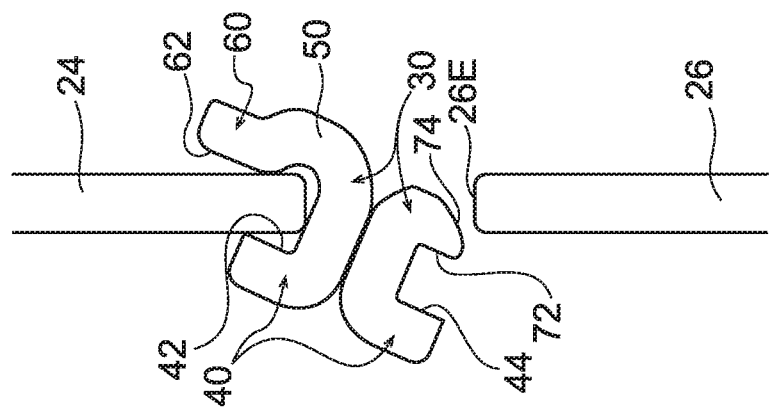
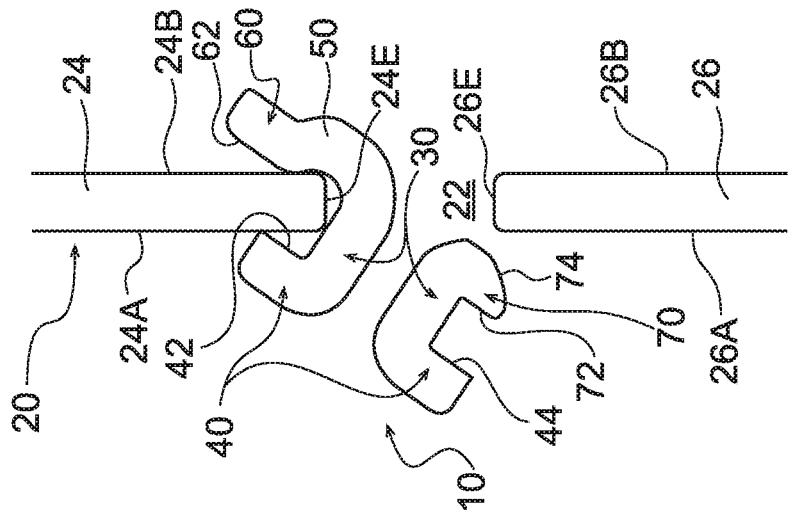

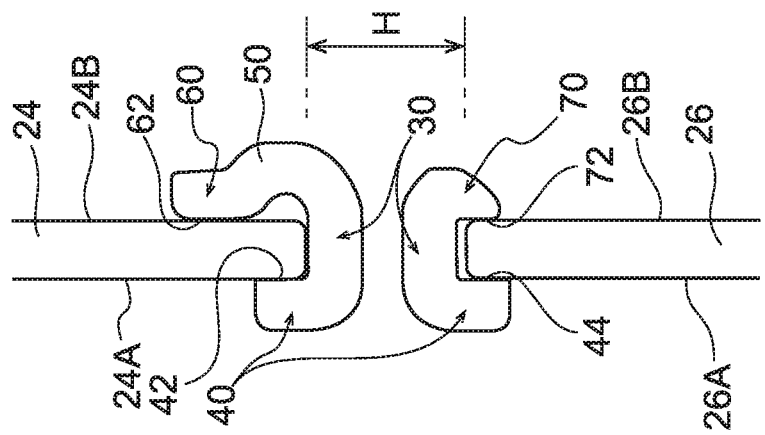
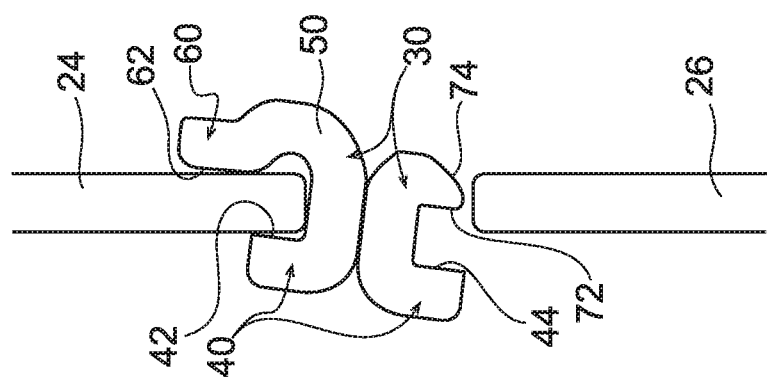

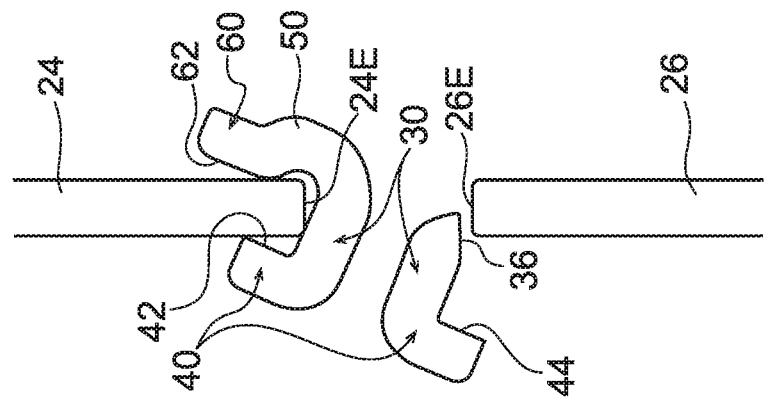
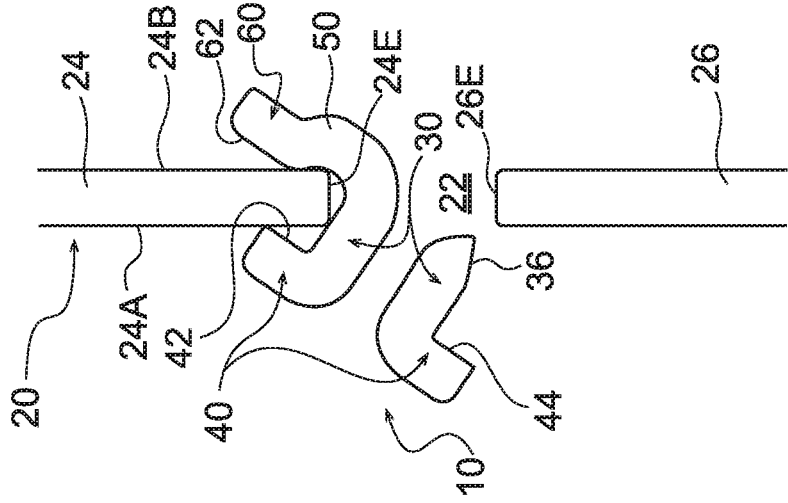

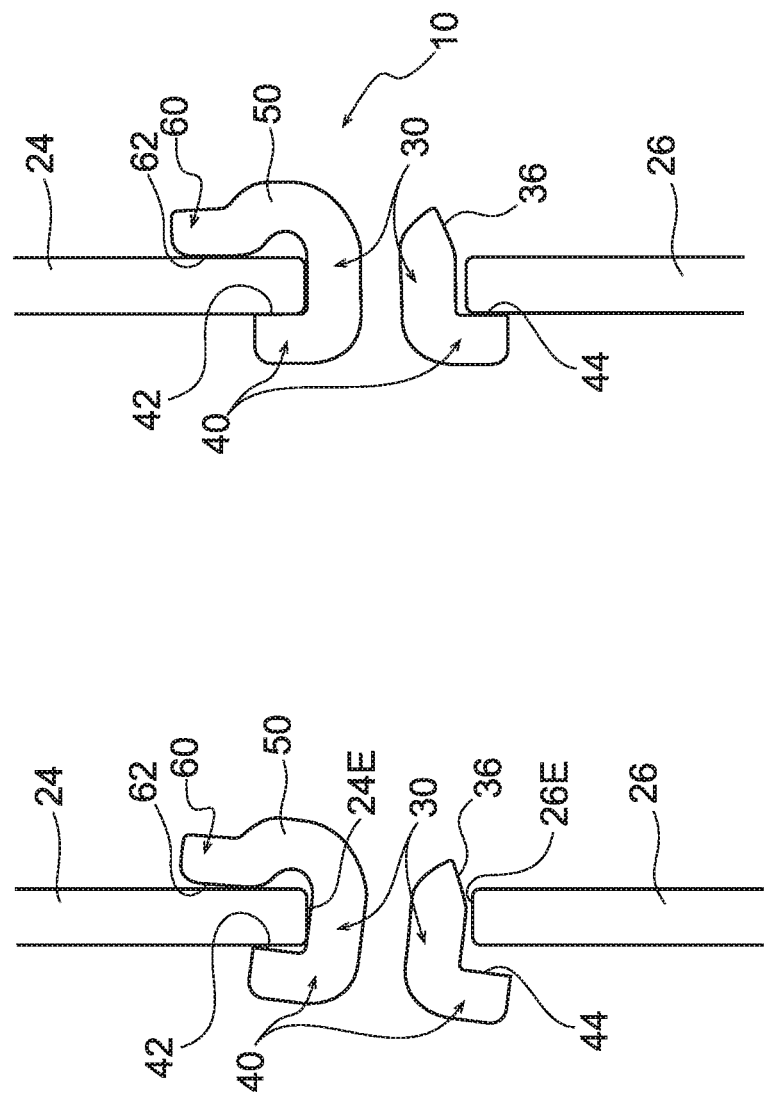

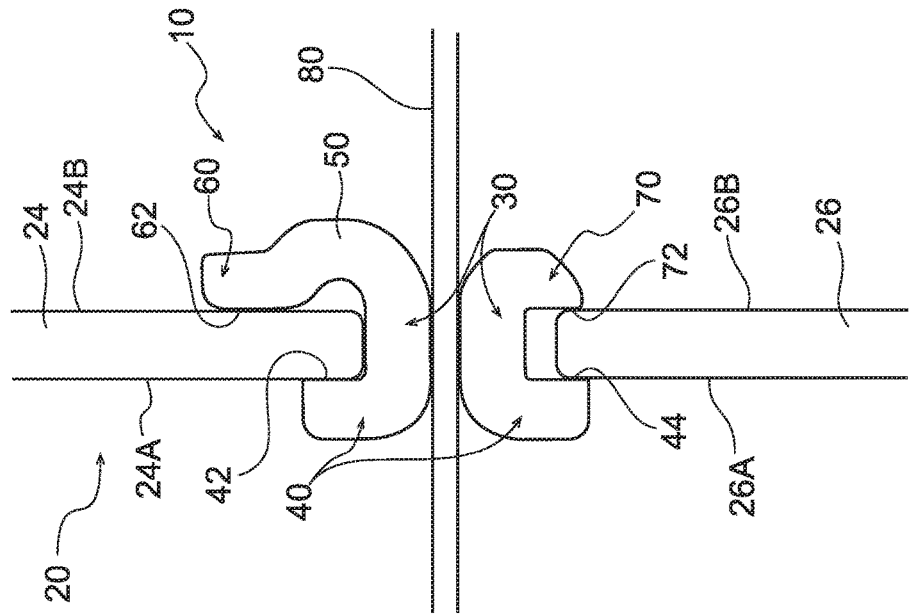
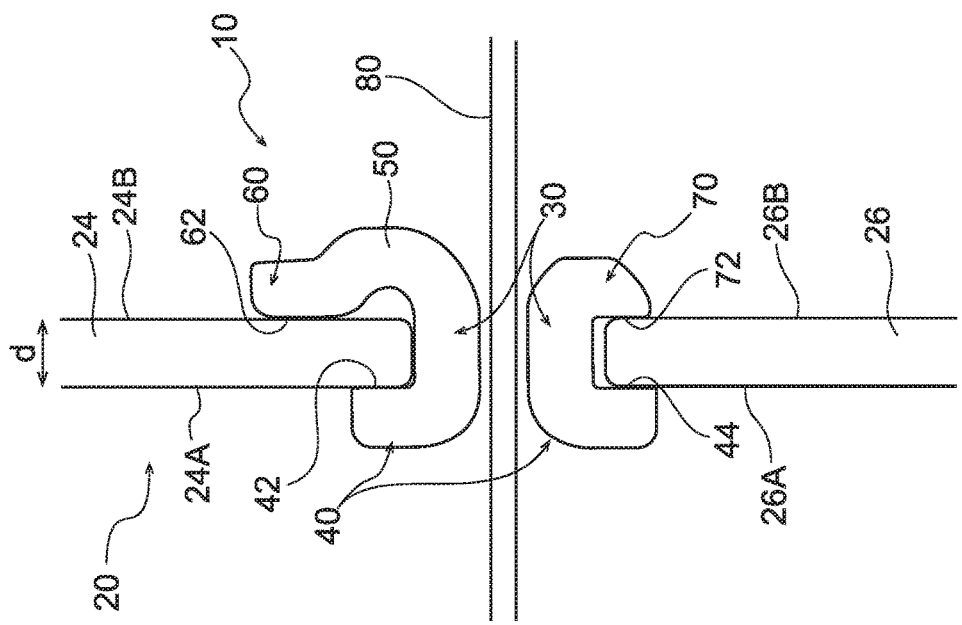

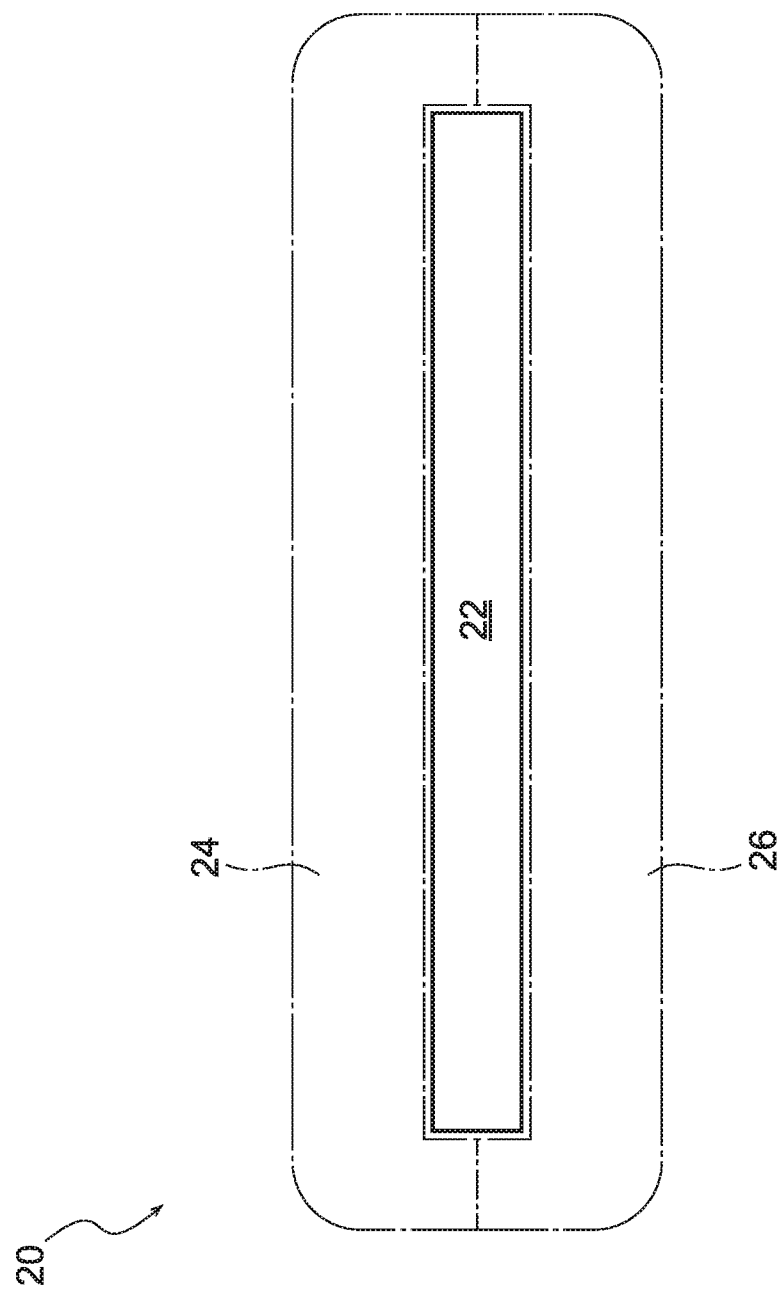

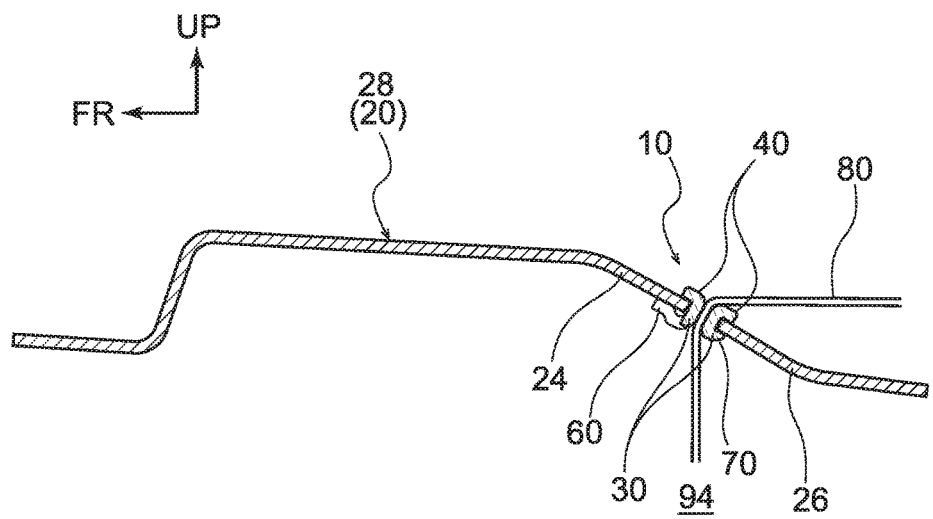
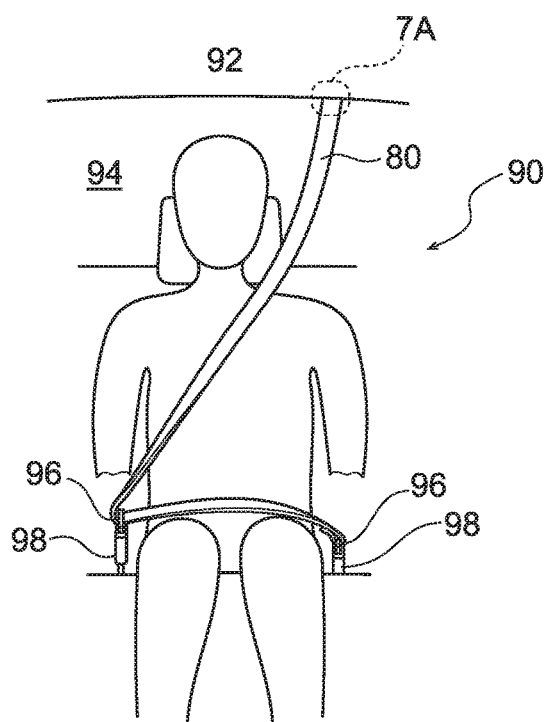

WEBBING GUIDE

CROSS-REFERENCE TO RELATED APPLICATION

This application is based on and claims priority under 35 USC 119 from Japanese Patent Application No. 2015-108888 filed on May 28, 2015, the disclosure of which is incorporated by reference herein.

BACKGROUND

Technical Field

The present disclosure relates to a webbing guide.

Related Art

A frame-shaped webbing guide that is assembled at a long hole penetrating a plate-shaped member (member for assembly) is known. For example, Japanese Patent Application Laid-open No. 2011-195064 discloses a webbing guide provided at a vehicle ceiling part in order to guide a webbing from the vehicle ceiling part into the vehicle cabin.

SUMMARY

As it happens, improvement of ease of assembly is desired in the operation of assembling a webbing guide to a member for assembly. However, when a webbing guide is given a configuration that is easy to assemble, it becomes easier for the webbing guide to detach from the member for assembly.

The present disclosure aims to obtain a webbing guide that is easy to assemble and is not easily detached, in view of the above-described circumstances.

A webbing guide of a first aspect of the present disclosure includes: a guide body that is tubular, that is disposed at a long hole-shaped opening of a member for assembly when the webbing guide is assembled with the member for assembly, and that has a webbing inserted through an inner part of the guide body; a front wall comprising front restriction parts that contact one side face of the member for assembly; a rear wall comprising a first rear restriction part that contacts another side face of a first opening edge part at one side in a transverse direction of the opening in the member for assembly; a claw comprising a second rear restriction part that contacts another side face of a second opening edge part at another side in a transverse direction of the opening in the member for assembly; and a connection part that connects the guide body with the rear wall, and that comprises a concave part at a face at a side of the first opening edge part such that when the webbing guide is assembled with the member for assembly, in a state in which the rear wall is disposed at the another side of the first opening edge part, the claw passes through the opening due to a leading end of the first opening edge part entering into the concave part.

The webbing guide of the first aspect of the present disclosure is assembled with a member for assembly. This webbing guide has a tubular guide body. The guide body is disposed at a long hole-shaped opening of the member for assembly and has a webbing inserted through an inner part.

Further, this webbing guide has a front wall. The front wall includes a front restriction part that contacts one side face of the member for assembly. Further, this webbing guide has a rear wall. The rear wall includes a first rear restriction part that contacts another side face of a first opening edge part at one side in a transverse direction of the opening in the member for assembly. In addition, this webbing guide has a claw. The claw includes a second rear restriction part that contacts another side face of a second opening edge part at another side in the transverse direction of the opening in the member for assembly.

In addition, this webbing guide has a connection part that connects the guide body and the rear wall. A face of the connection part at a side of the first opening edge part includes a concave part. Further, when assembling the webbing guide with the member for assembly, in a state in which the rear wall is disposed at the other side of the first opening edge part, a leading end of the first opening edge part enters into the concave part, whereby the claw passes through the opening.

That is, since the leading end of the first opening edge part can enter into the concave part, passage of the claw through the opening, and assembly of the webbing guide, are facilitated. Further, since it is not necessary to shorten the claw, detachment of the webbing guide is inhibited.

A webbing guide of a second aspect of the present disclosure is the first aspect in which: the first rear restriction part includes a planar first rear restriction face that contacts the another side face of the first opening edge part of the member for assembly; and the connection part includes a curved face that is continuous from the first rear restriction face.

In the webbing guide of the second aspect of the present disclosure, since the connection part includes a curved face that is continuous from the first rear restriction face, an operation of assembling the webbing guide with the member for assembly can be smoothly performed.

A webbing guide of a third aspect of the present disclosure is the first or second aspect in which more than one of the rear walls are provided in a longitudinal direction of the opening.

In the webbing guide of the third aspect of the present disclosure, since more than one of the rear walls are provided in a longitudinal direction of the opening, it is easier to compress the guide body in a transverse direction of the opening as compared to a webbing guide that is provided with a rear wall along the entire longitudinal direction region of the opening.

A webbing guide of a fourth aspect of the present disclosure is the third aspect in which the rear walls are provided at both sides in the longitudinal direction of the opening.

In the webbing guide of the fourth aspect of the present disclosure, since the rear walls are provided at both sides in the longitudinal direction of the opening, detachment of the webbing guide from the member for assembly is efficiently inhibited.

A webbing guide of a fifth aspect of the present disclosure is any one of the first to fourth aspects in which the webbing is inserted through the inner part of the guide body with a retractor device side of the webbing being directed toward a side of the front wall and a vehicle cabin side of the webbing being directed toward a side of the rear wall and the claw.

In the webbing guide of the fifth aspect of the present disclosure, the webbing is inserted through the inner part of the guide body with a retractor device side of the webbing being directed toward a side of the front wall and a vehicle cabin side of the webbing being directed toward a side of the rear wall and the claw. Therefore, when the webbing is pulled out from the retractor device, while a load is applied to the webbing guide in the direction of an opposite side from the retractor device, this load can be received at the front wall. As a result, detachment of the webbing guide from the member for assembly due to a load when the webbing is pulled out, is inhibited.

As explained above, the webbing guide of the present disclosure has the superior effects of being easy to assemble and difficult to detach.

BRIEF DESCRIPTION OF THE DRAWINGS

Exemplary embodiments of the present disclosure will be described in detail based on the following figures, wherein:

FIG. 2A is a sectional view showing a cross section along line 2A-2A in FIG. 1A, and FIG. 2B is a sectional view showing a cross section along line 2B-2B in FIG. 1A.

FIG. 3A to FIG. 3D show a sequence of assembly of the webbing guide with a member for assembly, and are sectional views showing cross sections of the webbing guide along line 3-3 in FIG. 1B.

FIG. 4A to FIG. 4D show a sequence of assembly of the webbing guide with a member for assembly, and are sectional views showing cross sections of the webbing guide along line 4-4 in FIG. 1B.

FIG. 5A and FIG. 5B show a state in which a webbing is inserted through the webbing guide in an assembled state, where FIG. 5A is a sectional view showing a state in which external force is not applied to the webbing guide, and FIG. 5B is a sectional view showing a state in which the webbing guide is bent.

FIG. 6 is a front view showing the vicinity of an opening of a member for assembly.

FIG. 7A is a sectional view showing a webbing guide assembly structure of the present embodiment, and FIG. 7B is a schematic diagram showing a rear seat seatbelt to which the webbing guide assembly structure has been applied.

DETAILED DESCRIPTION

Figure 1A:
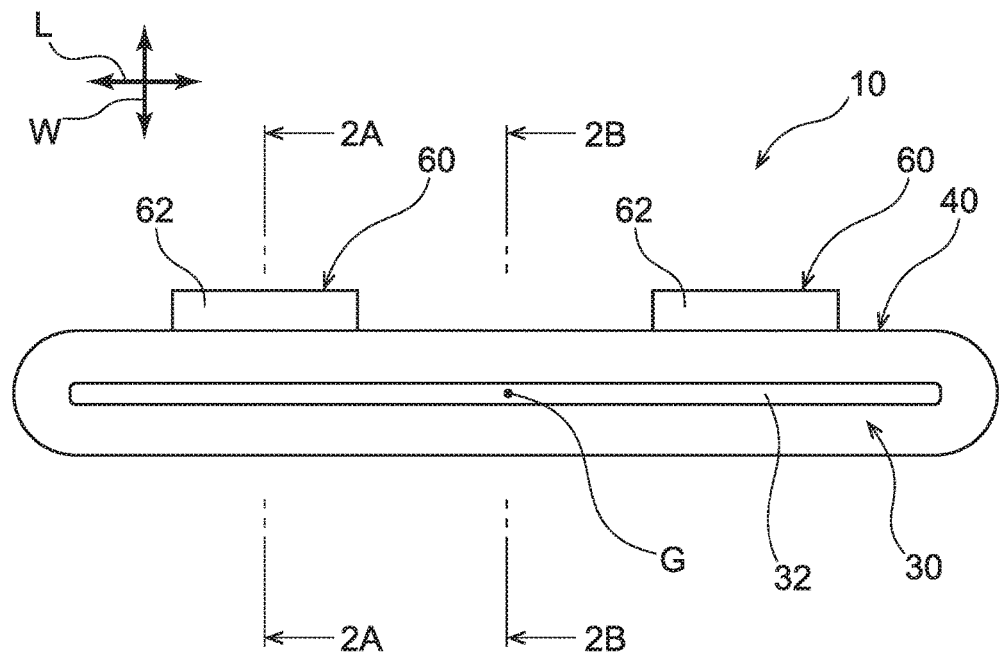
FIG. 1A shows a front view of a webbing guide of the present embodiment.

In the following, an embodiment of the webbing guide of the present disclosure is explained using FIGS. 1 to 7.

Member for Assembly

Webbing guide 10 of the present embodiment is used by assembly with a plate-shaped member (member for assembly 20) made of metal in which opening 22, which is a long hole-shaped through hole, is formed. For example, in a vehicle rear seat seatbelt 90 such as that shown in FIG. 7B, webbing guide 10 can be applied to a portion (portion 7A encircled with a dashed line) that guides webbing 80, which passes through vehicle ceiling part 92, into vehicle cabin interior 94. In this example, tongue 96 is engaged with buckle 98 at the vehicle side in order to fit webbing 80 onto a vehicle occupant, and bracket 28 (refer to FIG. 7A) for attaching a tongue holder (not shown in the drawings), which accommodates this tongue 96, to ceiling part 92, constitutes member for assembly 20. Webbing guide 10 is made of a synthetic resin.

It should be noted that the location at which webbing guide 10 is applied is not limited thereto, and for example, webbing guide 10 may be applied to a shoulder anchor part provided at a side wall of a vehicle cabin. Alternatively, it may be applied to a variety of locations as long as these are portions through which webbing 80 is inserted.

In the following explanation, as shown in FIG. 3 and FIG. 6, among the portions surrounding long hole-shaped opening 22 of member for assembly 20 (the edge parts of the opening), a portion at one side in a transverse direction of the opening is referred to as "first opening edge part 24", and the portion at the other side is referred to as "second opening edge part 26", with opening 22 disposed therebetween. Further, at the time of a webbing assembly operation, the side of the person doing the assembling—that is, the face (one side face) at the left side of member for assembly 20 in FIG. 3—is referred to as "assembly operation side faces 24A, 26A".

Webbing Guide

Figure 1B:
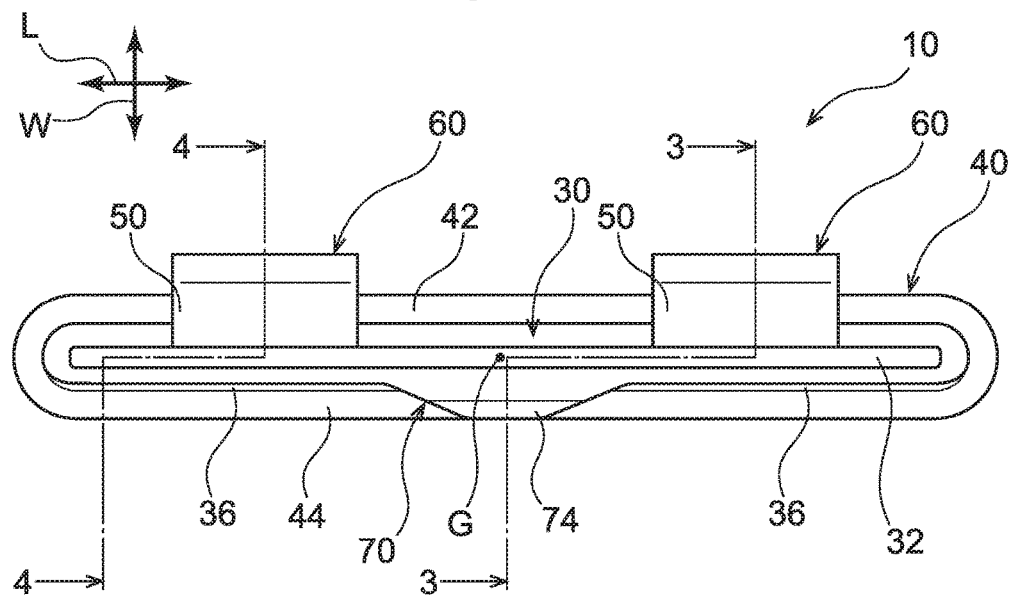
FIG. 1B shows a rear view of a webbing guide of the present embodiment.

FIG. 1A and FIG. 1B show webbing guide 10. As shown in these drawings, webbing guide 10 is formed overall in a flat frame shape, such that webbing 80 can be inserted through an inner part (insertion part 32). FIG. 5A shows a state in which webbing guide 10 is assembled with member for assembly 20 and, further, webbing 80 is inserted therethrough.

It should be noted that Arrow L shown in FIGS. 1A and 1B indicates a guide longitudinal direction that is a longitudinal direction of webbing guide 10 formed in a flat frame shape. Arrow W indicates a guide transverse direction that is a direction that is orthogonal to a guide insertion direction of webbing guide 80. Further, Arrow T shown in FIGS. 2A and 2B indicates the guide insertion direction that is the insertion direction of webbing 80 relative to webbing guide 10. In the following, when explaining the respective components of webbing guide 10, point G shown in the drawings is taken as the center of webbing guide 10, and directions approaching point G are referred to as a guide longitudinal direction inner side, a guide transverse direction inner side, and a guide insertion direction inner side. Conversely, directions diverging from point G are referred to as a guide longitudinal direction outer side, a guide transverse direction outer side, and a guide insertion direction outer side.

FIGS. 2A and 2B show cross sections sectioning webbing guide 10 along a plane orthogonal to the guide longitudinal direction. As shown in these drawings, webbing guide 10 includes guide body 30 through which the webbing is inserted, front wall 40 formed at guide body 30, rear wall 60 formed at guide body 30 via connection part 50, and claw 70 formed at guide body 30. It should be noted that while boundaries between the respective components are shown with dashed lines in these drawings for ease of explanation, boundaries between the respective components are not strictly established.

Guide Body

Webbing guide 10 includes guide body 30. Guide body 30 is tubular and is disposed at opening 22 of member for assembly 20. An inner part of guide body 30 is configured by insertion part 32, through which webbing 80 is inserted. A face (sliding face 34) at a guide transverse direction inner side of guide body 30 is gently curved toward the guide transverse direction outer side at both guide insertion direction outer sides so that the inserted webbing 80 slides in insertion part 32 without resistance.

Front Wall

At one side in the guide insertion direction of guide body 30 (the left side in FIGS. 2A and 2B), front wall 40 is provided standing upright toward the guide transverse direction outer sides. Front wall 40 is formed around the entire periphery of the tubular guide body 30 (refer to FIGS. 1A and 1B). A face at a guide insertion direction inner side of front wall 40 is configured as first front restriction face 42 and second front restriction face 44, which are on a plane orthogonal to the guide insertion direction. As shown in FIG. 5A, first front restriction face 42 and second front restriction face 44 respectively contact operation side faces 24A, 26A of first opening edge part 24 and second opening edge part 26 of member for assembly 20. First front restriction face 42 and second front restriction face 44 correspond to the "front restriction parts" of the present disclosure.

Rear Wall

Rear wall 60 is formed at the other side in the guide insertion direction of guide body 30 (the right side in FIGS. 2A and 2B) via connection part 50. Rear wall 60 is only formed at one side in the guide transverse direction of guide body 30 (the upper side in the respective drawings) and, further, as shown in FIGS. 1A and 1B, is formed at two places with a gap therebetween in the guide longitudinal direction, on either side of a guide longitudinal direction central part of guide body 30. A face at a guide insertion direction inner side of rear wall 60 is configured as first rear restriction face 62, which is on a plane orthogonal to the guide insertion direction. As shown in FIG. 5A, this first rear restriction face 62 contacts face 24B, which is at the opposite side from operation side face 24A, of first opening edge part 24 of member for assembly 20. First rear restriction face 62 corresponds to the "first rear restriction part" of the present disclosure.

Interval D1 in the guide insertion direction between first front restriction face 42 and first rear restriction face 62 is substantially the same as thickness d of member for assembly 20 and, precisely, is configured to be slightly larger than thickness d. As a result, as shown in FIG. 5A, first opening edge part 24 of member for assembly 20 is gripped between first front restriction face 42 of front wall 40 and first rear restriction face 62 of rear wall 60.

Further, as shown in FIG. 2A, guide transverse direction outer side end 42S of first front restriction face 42 is positioned further to a guide transverse direction inner side than guide transverse direction inner side end 62U of first rear restriction face 62. In other words, in front view (looking in the guide insertion direction), first front restriction face 42 and first rear restriction face 62 do not overlap. It should be noted that connection part 50, which is described in detail below, is formed at a portion that overlaps with first front restriction face 42 in front view.

Claw

As shown in FIG. 2B, claw 70 is formed at the other side in the guide insertion direction of guide body 30 (the right side in FIGS. 2A and 2B). Claw 70 is only formed at the other side in the guide transverse direction of guide body 30 (the lower side in the respective drawings) and, further, as shown in FIG. 1B, is only formed at a guide longitudinal direction central part of guide body 30. At claw 70, second rear restriction face 72 is formed, which contacts face 26B, which is at the opposite side from operation side face 26A, of second opening edge part 26 of member for assembly 20. Second rear restriction face 72 corresponds to the "second rear restriction part" of the present disclosure.

Interval D2 in the guide insertion direction between second front restriction face 44 of front wall 40 and second rear restriction face 72 of claw 70 is substantially the same as thickness d of member for assembly 20 and, precisely, is configured to be slightly larger than thickness d. As a result, as shown in FIG. 5A, second opening edge part 26 of member for assembly 20 is gripped between second front restriction face 44 of front wall 40 and second rear restriction face 72 of claw 70.

Further, inclined face 74 is formed at claw 70. The normal direction of inclined face 74 is inclined to the guide insertion direction outer side relative to the guide transverse direction outer side.

Connection Part

As shown in FIG. 2A, clearance face 52 is formed as a curved face at connection part 50, which connects guide body 30 and rear wall 60. Clearance face 52 is formed smoothly and continuously from the guide transverse direction inner side end 62U of first rear restriction face 62 of rear wall 60. Clearance face 52 curves gently towards the guide insertion direction outer side on progression towards the guide transverse direction inner side. On further progression towards the guide transverse direction inner side, the direction of curvature is reversed, curving towards the guide insertion direction inner side. In other words, clearance face upper part 52U at the guide transverse direction outer side of clearance face 52 is formed in a shape that curves convexly towards the guide insertion direction inner side, and clearance face lower part 52L at the guide transverse direction inner side is formed in a shape that curves concavely towards the guide insertion direction outer side.

By this configuration, clearance space 54 is formed as a concave part that is a space at a guide insertion direction outer side of a hypothetical plane extending first rear restriction face 62 as far as guide body 30. As shown in FIGS. 5A and 5B, member for assembly 20 is not disposed in this clearance space 54.

<Assembly Sequence>

Next, the assembly of webbing guide 10 with member for assembly 20 is explained using FIGS. 3A to 3D and FIGS. 4A to 4D.

First, as shown in FIG. 3A and FIG. 4A, rear wall 60 of webbing guide 10 is inserted through opening 22 of member for assembly 20 and rear wall 60 is disposed at the opposite side (the other side) from the operation side of first opening edge part 24. At this time, leading end 24E of first opening edge part 24 of member for assembly 20 enters into clearance space 54. That is, as a result of clearance space 54, leading end 24E of first opening edge part 24 can enter in at a guide transverse direction inner side of first rear restriction face 62, in a state in which first opening edge part 24 is disposed between first front restriction face 42 and first rear restriction face 62.

Next, as shown in FIG. 3B, FIG. 3C, FIG. 4B and FIG. 4C, with leading end 24E of first opening edge part 24 of member for assembly 20 kept inserted into clearance space 54, webbing guide 10 is rotated in an anticlockwise direction of the drawings. At this time, as shown in FIG. 3B and FIG. 3C, a guide longitudinal direction central part of guide body 30 is elastically deformed so as to be compressed in the guide transverse direction (a transverse direction of opening 22). As a result of this, claw 70, which is formed a guide longitudinal direction central part of webbing guide 10, can be inserted into opening 22. On the other hand, since claw 70 is not formed at the guide longitudinal direction end part shown in FIGS. 4A to 4D, webbing guide 10 can be inserted into opening 22 without elastic deformation of guide body 30.

Lastly, as shown in FIG. 3D, when deformation of webbing guide 10 (guide body 30) is released, claw 70 engages with second opening edge part 26 of member for assembly 20, and assembly is complete. As shown in this drawing, in a state in which webbing guide 10 is assembled with member for assembly 20, member for assembly 20 is not disposed in clearance space 54. After this, webbing 80 is inserted as shown in FIG. 5A. As a result, even if guide body 30 is bent towards the guide transverse direction inner side as in FIG. 5B, the engagement of claw 70 to second opening edge part 26 is not released due to the thickness of webbing 80.

It should be noted that from the state shown in FIG. 3A, inclined face 74 of claw 70 contacts second opening edge part 26 of member for assembly 20 as a result of pushing the lower portion in the drawings of webbing guide 10 to the right. At this time, due to an opposing force from second opening edge part 26, webbing guide 10 bends at a guide longitudinal direction central part and claw 70 can be inserted into opening 22 even without the person performing the assembly compressively deforming guide body 30 in a guide transverse direction.

Further, inclined face 36 is formed at guide body 30 and, at the time of assembly of webbing guide 10, assembly of webbing guide 10 can be performed smoothly as a result of leading end 26E of second opening edge part 26 contacting this inclined face 36.

<Action and Effect>

In the following, the action and effect of webbing guide 10 of the present embodiment is explained.

Webbing guide 10 of the present embodiment is assembled with member for assembly 20. Webbing guide 10 has tubular guide body 30. As shown in FIG. 5A, guide body 30 is disposed at long hole-shaped opening 22 of member for assembly 20, and webbing 80 is inserted through insertion part 32 at an internal part of guide body 30.

Further, webbing guide 10 of the present embodiment has front wall 40 formed at guide body 30. Front wall 40 includes first front restriction face 42 and second front restriction face 44, which contact assembly operation side faces 24A, 26A of first opening edge part 24 and second opening edge part 26 of member for assembly 20. Further, this webbing guide 10 has rear wall 60, which is formed at guide body 30 via connection part 50. Rear wall 60 includes first rear restriction face 62, which contacts face 24B, which is at the opposite side from assembly operation side face 24A, of first opening edge part 24 of member for assembly 20. In addition, this webbing guide 10 has claw 70 formed at guide body 30. Claw 70 includes second rear restriction face 72, which contacts face 26B, which is at the opposite side from assembly operation side face 26A, of second opening edge part 26 of member for assembly 20.

Further, webbing guide 10 of the present embodiment has connection part 50, which connects guide body 30 and rear wall 60. Connection part 50 includes clearance space 54 at a face of connection part 50 at a side of first opening edge part 24. Further, when webbing guide 10 is assembled with member for assembly 20, in a state in which first opening edge part 24 is inserted between front wall 40 and rear wall 60, claw 70 is passed through opening 22 as a result of guide body 30 being compressed toward a guide transverse direction inner side and leading end 24E of first opening edge part 24 entering into clearance space 54.

That is, in a state in which the guide transverse direction of webbing guide 10 is inclined with respect to the transverse direction of opening 22 when claw 70 passes through opening 22 as shown in FIGS. 3B and 3C, first opening edge part 24 can be deeply inserted between front wall 40 and rear wall 60, whereby the passage of claw 70 through opening 22 and the assembly of webbing guide 10 are both facilitated. Further, since it is not necessary to reduce the protrusion amount of claw 70 toward the guide transverse direction outer side, detachment of webbing guide 10 is inhibited.

In addition, the width of opening 22 can be set to be more narrow, as a result of which looseness of webbing guide 10 relative to member for assembly 20 in the guide transverse direction can be suppressed and reversal of webbing 80 that has been inserted through insertion part 32 can be inhibited.

Further, even if interval D1 in the guide insertion direction between first front restriction face 42 of front wall 40 and first rear restriction face 62 of rear wall 60 is reduced, in a state in which the guide transverse direction of webbing guide 10 is inclined relative to the guide transverse direction of opening 22 when assembling webbing guide 10 with member for assembly 20, first opening edge part 24 can be deeply inserted between front wall 40 and rear wall 60 due to clearance space 54 of connection part 50. As a result, the size of interval D1 can be reduced and looseness of webbing guide 10 relative to member for assembly 20 in the guide insertion direction can be suppressed.

Further, in webbing guide 10 of the present embodiment, since connection part 50 includes a curved face (clearance face 52) that is smoothly continuous from first rear restriction face 62, clearance face 52 can easily move relative to first opening edge part 24, and the operation of assembling webbing guide 10 with member for assembly 20 can be smoothly performed. Further, molding of webbing guide 10 is simple.

Further, in webbing guide 10 of the present embodiment, rear wall 60 is formed at two places, on either side of a guide longitudinal direction central part of guide body 30. As a result, compared to a configuration in which rear wall 60 is provided at the entire longitudinal direction region of opening 22, it is easy to compress guide body 30 toward the guide transverse direction inner side. Further, since rear wall 60 is not simply formed at both sides in the guide longitudinal direction of guide body 30, but is formed at portions that are difficult to bend, avoiding the guide longitudinal direction central part of guide body 30, which is easy to bend, detachment of webbing guide 10 is efficiently inhibited.

Further, in webbing guide 10 of the present embodiment, as shown in FIG. 7A, bracket 28, serving as member for assembly 20, is disposed at an inclination relative to a vehicle front-rear direction in the vicinity of opening 22. Further, webbing 80, as fed out from a retractor device that is disposed at a vehicle rear side and not shown in the drawings, spans ceiling part 92 toward the vehicle front, changes direction by passing through webbing guide 10 assembled with bracket 28, and is guided into vehicle cabin 94.

Incidentally, in this kind of configuration, a load from webbing 80, which has been forcefully pulled out from the retractor device at the time of a vehicle collision, can be posited as a large load that might be applied to webbing guide 10. At such a time, the load applied to webbing guide 10 is a load in the pull-out direction of webbing 80. That is, since webbing 80 is pulled out from the retractor device towards the side of vehicle cabin 94, load is applied to webbing guide 10 in the direction of the side of vehicle cabin 94 (substantially a downward direction in the drawings).

Here, in webbing guide 10 of the present embodiment, front wall 40 is disposed at the retractor device side of bracket 28 (the upper side in the drawings), and rear wall 60 and claw 70 are disposed at the vehicle cabin 94 side of bracket 28 (the lower side in the drawings). That is, webbing 80 directs the retractor device side of webbing 80 toward the side of front wall 40 and, in addition, directs the vehicle cabin 94 side of webbing 80 towards rear wall 60 and claw 70. As a result, due to front wall 40, which is disposed at the retractor device side of bracket 28, detachment of webbing guide 10 toward the side of vehicle cabin 94 is inhibited. In particular, in the present embodiment, since front wall 40 is formed along the entire periphery of the tubular guide body 30, passage of front wall 40 through opening 22 of bracket 28 is effectively inhibited, and detachment of webbing guide 10 from bracket 28 as a result of a load from webbing 80 in the pull-out direction is yet further inhibited.

[Supplementary Explanation of the Above-Described Embodiment]

It should be noted that in the above-described embodiment, while first front restriction face 42, first rear restriction face 62, second front restriction face 44 and second rear restriction face 72, which serve as the front restriction parts, the first rear restriction part and the second rear restriction part, are each formed as planar faces, the present disclosure is not limited thereto. These need not be planar faces as long as detachment of webbing guide 10 is inhibited by member for assembly 20 being inserted between the respective faces.

Further, in the above-described embodiment, while first front restriction face 42 of front wall 40 and first rear restriction face 62 of rear wall 60 do not overlap in front view, the present disclosure is not limited thereto, and a portion of an upper part (the guide transverse direction outer side) of the first front restriction face and a lower part (the guide transverse direction inner side) of the first rear restriction face may overlap. In such a case, interval D1 in the guide insertion direction between the first front restriction face and the first rear restriction face may be set to be wider than thickness d of the member for assembly.

Further, in the above-described embodiment, while clearance face 52 of connection part 50 is provided with a curved shape, the present disclosure is not limited thereto, and, for example, in the cross-sectional profile shown in FIGS. 2A and 2B, the clearance face may be provided with an angular shape.

Further, in the above-described embodiment, while front wall 40 is formed along the entire periphery of tubular guide body 30, the "front wall" of the present disclosure is not limited thereto. For example, a front wall provided with first front restriction face 42 and a front wall provided with second front restriction face 44 may be separately formed.

Further, in the above-described embodiment, while rear wall 60 is formed at two places, on either side of a guide longitudinal direction central part of guide body 30, the "rear wall" of the present disclosure is not limited thereto. For example, a single rear wall may be formed at the guide longitudinal direction central part, or a single rear wall may be formed along substantially the entire guide longitudinal direction.

Further, in the above-described embodiment, while claw 70 does not interfere with second opening edge part 26 in a state in which guide body 30 is compressed and deformed toward the guide transverse direction inner side to the extent that insertion part 32 is closed as shown in FIG. 3B and FIG. 3C, the present disclosure is not limited thereto. For example, at a time when claw 70 is passed through opening 22 in a state in which guide body 30 is compressed and deformed toward the guide transverse direction inner side to the extent that insertion part 32 is closed, claw 70 may be elastically deformed by second opening edge part 26. Further, even in a case in which guide body 30 is not compressed and deformed toward the guide transverse direction inner side, claw 70 may be passed through opening 22 by elastic deformation or the like of claw 70, for example, and webbing guide 10 assembled with member for assembly 20 thereby.

Further, in the states shown in FIGS. 5A and 5B, there may be a gap between first front restriction face 42 and operation side face 24A of first opening edge part 24, and there may be a gap between second front restriction face 44 and operation side face 26A of second opening edge part 26. Further, there may be a gap between first rear restriction face 62 and face 24B, at the opposite side from operation side face 24A, of first opening edge part 24. Further, there may be a gap between second rear restriction face 72 and face 26B, at the opposite side from operation side face 26A, of second opening edge part 26.

What is claimed is:

1. A webbing guide, comprising:
   a guide body that is tubular, that is disposed in a long hole-shaped opening of a member for assembly when the webbing guide is assembled in the opening of the member for assembly, and that has a webbing inserted through an inner part of the guide body;
   a front wall of the guide body comprising front restriction parts that contact a first side face of the member for assembly at a first side of the opening in said member;
   a rear wall comprising a first rear restriction part that contacts a second side face of the member that is opposite said first side face in a direction of passage of the webbing across sliding faces of the inner part of the guide body;
   a claw comprising a second rear restriction part that contacts said second side face at an opposite side of the opening in said member from said first rear restriction part; and
   a connection part that connects a sliding face of the guide body with the rear wall of the guide body, and that comprises a concave part that faces toward one of said front restriction parts such that, when the webbing guide is assembled in the member for assembly, the claw is able to pass through the opening in the member by a leading end of an opening edge part of the member first side of the opening in said member entering into the concave part.

2. The webbing guide according to claim 1, wherein:
   the first rear restriction part comprises a planar first rear restriction face that contacts the another side face of the first opening edge part of the member for assembly; and
   the connection part comprises a curved face that is continuous from the first rear restriction face.

3. The webbing guide according to claim 1, wherein a plurality of the rear walls are provided in a longitudinal direction of the opening.

4. The webbing guide according to claim 3, wherein the rear walls are provided at both sides in the longitudinal direction of the opening.

5. The webbing guide according to any one of claim 1, wherein the webbing is inserted through the inner part of the guide body, with a retractor device side of the webbing being directed toward a side of the front wall and a vehicle cabin side of the webbing being directed toward a side of the rear wall and the claw.

6. The webbing guide according to any one of claim 1, wherein the concave part of the connection part is not complementary in shape to the opening edge part of the member.

* * * * *